INVENTORS.
KERAMET O. UCER
MICHAEL B. McSHANE

United States Patent Office 3,572,108
Patented Mar. 23, 1971

3,572,108
MEANS FOR TESTING WIRE BONDS IN
MICROELECTRONIC CIRCUITS
Michael B. McShane, Costa Mesa, and Keramet O. Ucer,
Newport Beach, Calif., assignors to Collins Radio
Company, Dallas, Tex.
Filed June 5, 1969, Ser. No. 830,717
Int. Cl. G01l 5/00
U.S. Cl. 73—141                    2 Claims

ABSTRACT OF THE DISCLOSURE

Apparatus for testing wire bonds in microelectronic circuits including a circuit holder and gauge means which is movably supported to travel towards or away from said circuit holder. The gauge means includes wire grasping means which is operatively connected to the gauge means. After grasping a wire in a microelectronic circuit on said circuit holder, the gauge means is moved away from the support means until the wire or bond fails, and the force required is registered by the gauge means.

---

This invention relates generally to the manufacture of microelectronic circuits, and in particular to the testing of wire bonds in microelectronic circuits.

It is conventional practice in manufacturing microelectronic circuits, whether integrated or hybrid, to encapsulate a circuit inside a protective package having conductive leads integrally constructed therewith and extending therefrom. The circuit substrate is mounted to the bottom wall inside the package and fine wires interconnect the circuit to the conductive leads of the package. The fine wires, usually of gold or aluminum with a diameter on the order of 1 to 3 mils, are applied by ultrasonic or thermocompression bonding by use of conventional, commercially available bonding equipment.

Satisfactory wire bonds are dependent on proper operation of the bonding equipment. Unfortunately, mechanically defective bonds usually cannot be detected by electrical testing. Therefore, it has become common practice to mechanically test bonds periodically to verify continued proper operation of the bonding equipment. Tweezers can be employed by the machine operator to destructively test if the bond strength exceeds the wire strength, but a satisfactory bond need not necessarily have the strength of the wire. Further, to accurately adjust the bonding equipment, the actual fatigue point of the bond, expressed in grams, is necessary Accordingly, an object of this invention is a means for accurately testing wire bonds in microelectronic circuits.

Another object of the invention is bond testing apparatus which is easily employed in microelectronic circuit production.

These and other objects and features of the invention will be apparent from the following description and appended claims.

Briefly, the bond testing apparatus includes a base member and work holder for supporting a circuit under test. Gauge means is movably supported on a support column extending above the base member, and a wire hook extends downwardly toward the work holder from the gauge lever arm. Drive means is provided to move the gauge means toward and away from the work holder.

In operation, a microelectronic circuit is positioned on the work holder and the gauge member is lowered so that the wire hook may be connected to a wire bond. The gauge means is then moved away from the work holder and microelectronic circuit thereby pulling the wire until the wire or bond fails. The strength of the wire and bond as registered on the gauge is used in adjusting the bonding equipment, if necessary.

The invention will be more fully understood from the following detailed description when taken with the drawing, in which.

Figure 1:
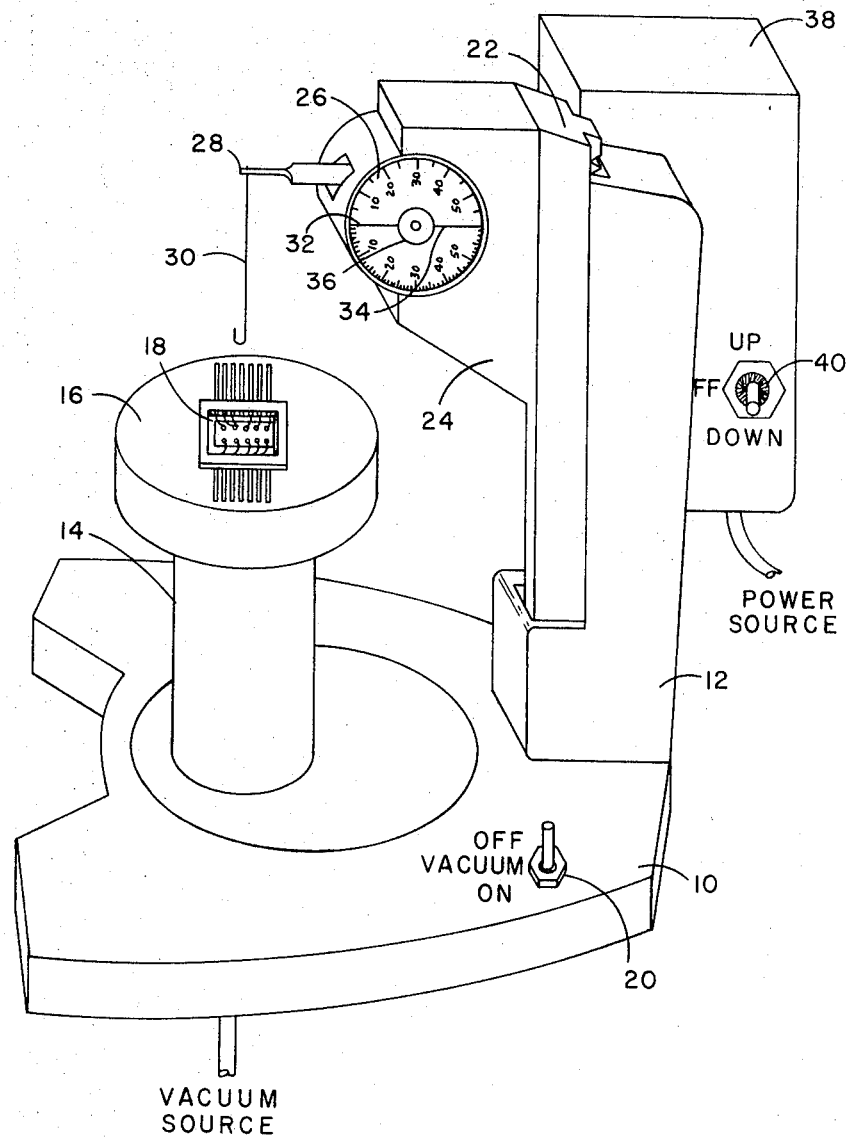
FIG. 1 is a perspective view of one embodiment of the invention.
Figure 2:
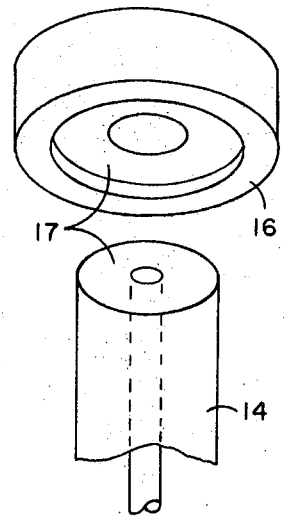
FIG. 2 is a perspective exploded view of the circuit holding portion of the apparatus of FIG. 1.

Referring now to the drawing, FIG. 1 is a perspective view of one embodiment of the invention. This embodiment is a modification of a standard American Optical microscope stand including a base or pedestal 10 and a support column 12 extending from and above the base 10. A cylindrical member 14 extends upwardly from base 10 and supports a work holder 16. In a preferred embodiment, cylindrical member 14 and work holder 16 are bored so that a vacuum may be applied therethrough to maintain a microelectronic circuit 18 on the surface of work holder 16. Further, as shown in FIG. 2, the interface betwen cylindrical member 14 and work holder 16 is provided by grease plates 17 which allows the work holder 16 and microelectronic circuit 18 to be movably positioned horizontally. Switch 20 is provided on base 10 to actuate and deactuate the vacuum which maintains the microelectronic circuit 18 on work holder 16.

Support column 12 accommodates a rack drive member 22 which includes a gauge support member 24. Gauge 26 is supported by support 24. Preferably, gauge 26 is a Correx Gramm gauge manufactured by Aliva Corporation and includes a lever arm 28 from which a rigid wire hook 30 depends. Gauge 26 includes two indicator arms 32 and 34 one of which moves proportionately to the movement of lever arm 28 and the other of which registers a maximum movement of lever 28. Knob 36 is provided to re-set the latter indicator.

Drive means 38 is also mounted to support column 12 and functions to move rack drive member 22 when actuated by three position switch 40. In one embodiment the drive means 38 included a Hurst PC-DA motor including an integral gear box which reduces the 1800 r.p.m. motor speed to 1 r.p.m. at the output of the gear box. In this embodiment the rack drive member 22 has a speed of 0.001 inch per second.

Figure 3:
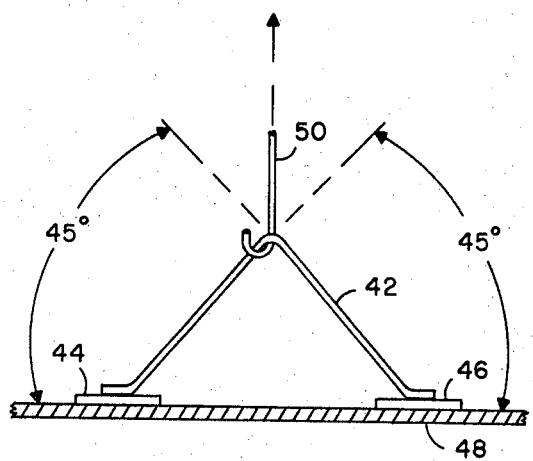
FIG. 3 illustrates wire bonds under test.

In operation, a microelectronic circuit 18 is maintained on work holder 16 by means of vacuum. Gauge 26 is lowered until wire hook 30 can engage a test wire which is bonded on the microelectronic circuit. Referring to FIG. 3, test wire 42 is preferably bonded to two bonding pads 44 and 46 on the microelectronic substrate 48. The length of wire 42 is chosen so that when hook 50 engages the middle portion of wire 42, the wire assumes an angle of approximately 45 degrees with respect to the substrate, as indicated. After the wire 42 is grasped by hook 50, gauge 26 is moved away from the microelectronic circuit 18, shown in FIG. 1, until the wire or bond fails. The failure strength is indicated on the gauge 26.

Figure 4:
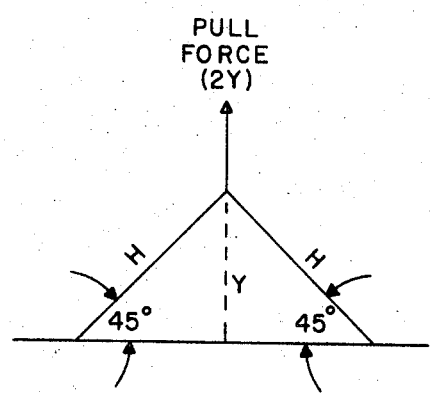
FIG. 4 is a representation of forces during test of a wire bond.

The force, Y, necessary to test the tensile strength, H, of the wire may be expressed as follows, with reference to FIG. 4:

$$\text{Sine } 45° = \frac{Y}{H}$$

Since sine 45°=0.707 it follows that $$Y = 0.707H$$

Since two bonds are employed in this wire configuration, the total pulling force is expressed as $$\text{Pull force} = 2[0.707H] = 1.414H$$

Based on these calculations, the following table has been compiled for several sizes of gold aluminum wire:

| | Size, mils | Average wire tensile strength, grams | Average pull strength gauge reading, grams |
|---|---|---|---|
| Wire type: | | | |
| Gold | 1.0 | 8 | 11 |
| | 1.5 | 18 | 25 |
| | 2.0 | 31 | 44 |
| | 3.0 | 70 | 99 |
| Aluminum | 1.0 | 11 | 16 |
| | 3.0 | 100 | 141 |

The wire bond test apparatus in accordance with the present invention has proved very useful in maintaining proper operation of microelectronic circuit wire bonding apparatus and consequently has increased the yield rate of manufactured circuits. The apparatus is easily accommodated in a production facility including wire bonding apparatus. While the invention has been described with reference to a specific embodiment, the description is illustrative and not to be construed as limiting the scope of the invention. Various modifications and changes may occur to those skilled in the art without departing from the spirit and scope of the invention.

What is claimed is:

1. Apparatus for testing wire bonds in microelectronic circuits comprising a fixed base portion, a support means extending from and above said base portion, vacuum circuit holding means on said base portion, a mechanically driven rack element movably supported by said support means, gauge means, means for supporting said gauge means on said mechanically driven element, means for grasping a wire depending from said gauge means and operatively connected to said gauge means, and drive means for driving said mechanically driven element thereby moving said gauge means toward or away from said support means.

2. Apparatus in accordance with claim 1 wherein said circuit holding means includes a cylindrical member and a circuit holding member having a grease plate interface thereby allowing said circuit holding member to be movably positioned with respect to said gauge means.

References Cited

UNITED STATES PATENTS

| 3,127,766 | 4/1964 | Wolle | 73—141 |
| 3,321,961 | 5/1967 | Le Boeuf et al. | 73—103 |
| 3,464,261 | 9/1969 | Helms | 73—96 |

OTHER REFERENCES

J. R. Resch: "Film Adhesion Test Apparatus," IBM Technical Disclosure Bulletin, vol. 9, No. 9, February 1967.

"Hunter Pull Testers," publication by Hunter Spring Co., pp. 1-4, Aug. 4, 1961.

CHARLES A. RUEHL, Primary Examiner

U.S. Cl. X.R.

73—95